Nov. 12, 1968 R. G. METZNER 3,410,470

TAPE DRIVE MECHANISM

Filed Sept. 6, 1966 2 Sheets-Sheet 1

INVENTOR.
ROBERT G. METZNER
BY R. E. Grangue
ATTORNEY

INVENTOR.
ROBERT G. METZNER
BY R. E. Geauque
ATTORNEY 3,410,470
TAPE DRIVE MECHANISM
Robert G. Metzner, Beverly Hills, Calif., assignor to Rheem Manufacturing Company, New York, N.Y., a corporation of California
Filed Sept. 6, 1966, Ser. No. 577,495
3 Claims. (Cl. 226—109)

ABSTRACT OF THE DISCLOSURE

A tape drive mechanism, having an integral shaft in which the shaft has a first capstan for driving a first tape, and a second capstan for driving a second tape, and a flywheel located on said shaft intermediate of said capstans and driving both said capstans.

This invention relates to magnetic tape drive mechanisms, and, more particularly, to a tape drive mechanism for simultaneously driving tape through a conventional reel-to-reel device and driving tape through an endless-tape cartridge.

Reel-to-reel tape recording and playback devices are well known in the art. In such devices, magnetic tape is transferred from a supply reel, past an electromagnetic recording and/or playback head, to a takeup reel. This type of apparatus is available from a number of manufacturers, and so will not be gone into in detail herein, except for that specific portion that relates to the present invention.

Recently, apparatus has been developed whereby a recording on an endless tape in a cartridge can be transferred to a regular reel-to-reel tape. However, this has required the use of separate drive mechanism for the tape cartridge, which, of course, entails duplication inasmuch as the reel-to-reel device has its own drive mechanism. The present invention is directed to eliminating this duplication of drive mechanisms, by utilizing the drive mechanism of the reel-to-reel device to drive the tape in the cartridge.

In most conventional reel-to-reel tape mechanisms, drive power is provided from a motor to a capstan that is driven through a flywheel, the flywheel aiding in maintaining the rotational speed of the capstan constant. The tape is advanced by being pressed against the capstan by an idler known as a pinch wheel. When it is desired to stop movement of the tape, the pinch wheel is moved out of contact with the tape and, although the capstan continues to revolve, movement of the tape is stopped. Of course, rotation of the takeup reel is also stopped.

Tape cartridges presently known are self-contained devices having an endless tape therein. They contain no drive mechanism or electromagnetic heads and must be inserted into mechanism that provides the tape drive and electronics. Such tapes generally have pre-recorded sound thereon and so the electronics involves only playback means.

The tape cartridges are open at one end so that the electromagnetic head or heads can contact the tape within the cartridge and so that a rotating capstan can press the tape against an idler wheel within the cartridge around which the tape passes. The heads and capstan are external to the cartridge, of course, and have generally been peculiar to various manufacturer's equipments.

The present invention contemplates a dual device which includes a conventional reel-to-reel tape recorder and mechanism for playing back cartridge-contained tape, using a single drive mechanism. The device of the invention comprises a reel-to-reel mechanism mounted in or on the upper portion of the device, and means for accepting a conventional cartridge in the lower portion of the device. Electromagnetic heads are provided in the lower portion, which engage the tape in the cartridge when the cartridge is inserted into the device. The capstan that drives the reel-to-reel tape in the upper portion is extended downwardly so that it engages the tape in the cartridge and presses it against a cartridge idler wheel when the cartridge is in position in the device. Thus, the tape drive mechanism for the reel-to-reel recorder synchronously drives the tape in the cartridge, and much superfluous equipment is eliminated.

The invention, together with further features and advantages, will be better understood from the following description, taken in conjunction with the accompanying drawings, in which.

Figure 1:
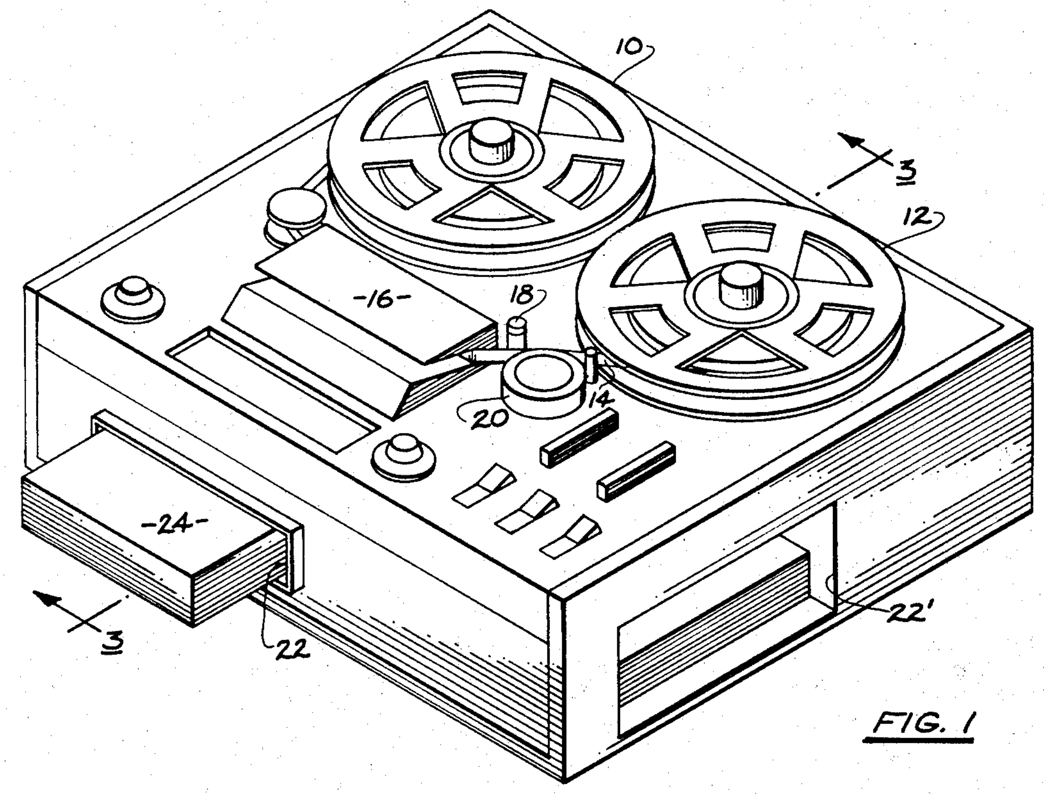
FIGURE 1 is a perspective view of a magnetic tape recorder and playback device embodying the invention.

As shown in FIGURE 1, externally the device of the invention looks much like a conventional tape recorder having a pair of reels 10 and 12 between which tape 14 passes. The tape 14 is moved past a recording and reproduce head, shown generally by the numeral 16. That reel which is serving as the takeup reel is rotatably driven, and the tape 14 is itself positively driven. The tape is driven by a rotating capstan 18, and the tape 14 is pressed against the capstan 18 and pinch wheel 20 may be provided with frictional surfaces for engaging the tape to insure its positive advancement. Of course, the usual controls are provided for controlling playback volume, tone, tape speed, direction of tape movement, etc. These controls are conventional and need not be described in detail.

The lower portion of the device is provided with a suitable opening 22 into which a conventional tape cartridge 24 may be inserted when it is desired to transfer a recording from the cartridge tape to the reel-to-reel tape 14. The cartridge 24 may be inserted into the opening 22 in the front of the device, or an opening 22′ may be provided on the side of the device. The positions of the openings 22 or 22′ are important only insofar as a cartridge inserted into one of the openings must properly engage the internal drive mechanism, as will be pointed out hereinafter.

Figure 2:
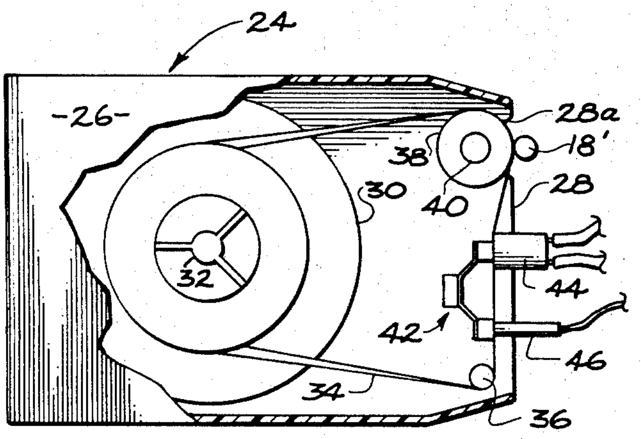
FIGURE 2 is a plan view of a tape cartridge usable in the device of FIGURE 1.

FIGURE 2 shows a conventional tape cartridge 24 comprising a flat, metal or plastic case 26, which is open at one end 28. Contained within the case 26 is a reel 30 suitably mounted to rotate on an axle 32 and carrying an endless tape 34. Near the open end 28 of the cartridge, the tape 34 passes around a guide 36 and an idler wheel 38. The wheel 38 is made of a resilient material having good frictional properties and is mounted for free rotation on an axle 40. The end 28 of the cartridge is cut out, as at 28*a*, so that when the cartridge is inserted into the device of the invention a drive member can contact the tape within the cartridge.

The cartridge 24 is also provided with a spring mechanism, shown generally at 42, past which the tape 34 passes intermediate the guide 36 and wheel 38. When the cartridge is inserted in the playback device, the spring mechanism 42 serves to press the tape against an electromagnetic pickup head 44 and against a track selector sensing post 46. Electromagnetic tapes of the kind used in tape cartridges generally contain a plurality of tracks (eight, for example) of recorded sound, and automatically switch from one to the next track at the proper time. The track selector sensing post 46 serves to detect when the pickup head 44 should switch from one recorded track to another. This technique is well known in the art and forms no part of the present invention.

Figure 3:
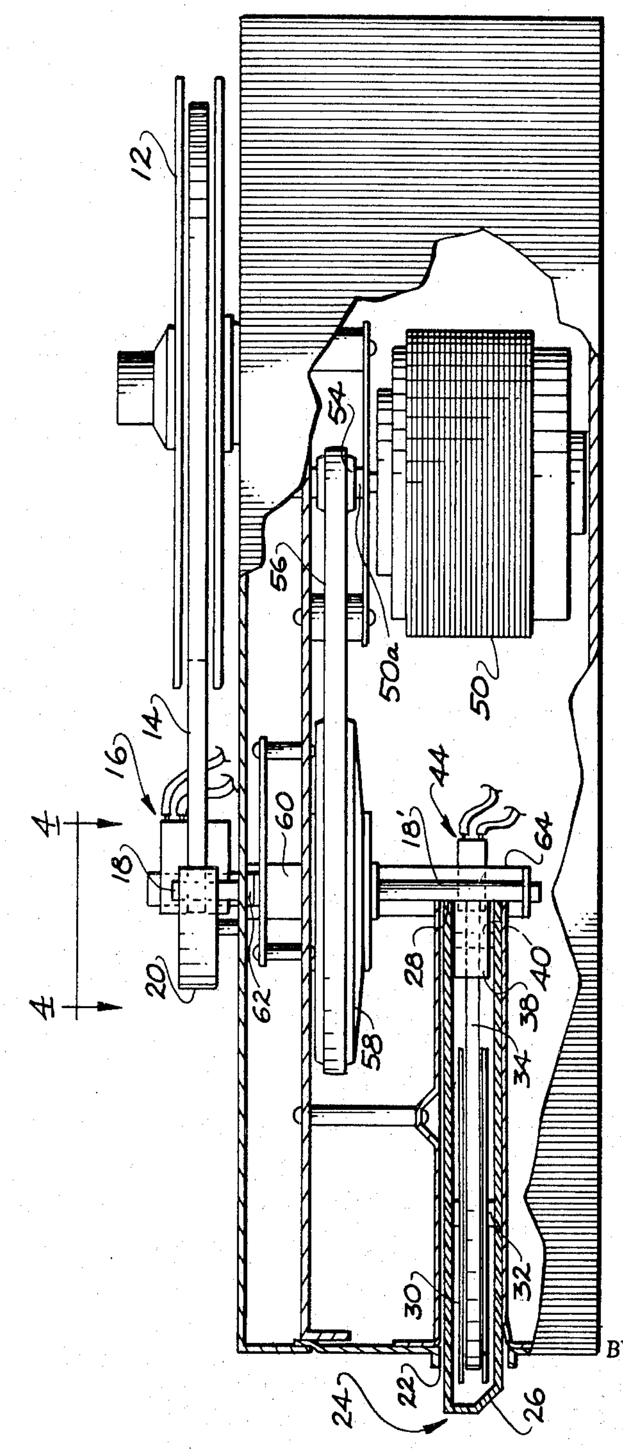
FIGURE 3 is an elevational view of a portion of the internal mechanism of the device of FIGURE 1, taken along the lines 3—3 of FIGURE 1, clearly illustrating the invention.
Figure 4:
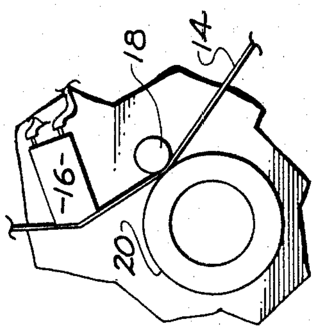
FIGURE 4 is a plan view of a portion of the drive mechanism of the device shown in FIGURE 3.

Looking now at FIGURE 3, it is seen that motive power for the device is provided by a motor 50 having a drive shaft 50*a*. The drive shaft 50*a* is connected through conventional drive linkages (not shown), to drive the tape reels 10 and 12. The motor 50 also has mounted on its drive shaft 50*a* a pulley 54, which drives a belt 56 which, in turn, rotates a flywheel 58. The flywheel 58 is mounted on a shaft 62, which is suitably mounted in conventional bearings 60, and provides the axis for the flywheel 58. The shaft 62 is reduced in diameter at its upper end to serve as the capstan 18 previously mentioned. The parts thus far mentioned and shown in FIGURE 3 are entirely conventional and well known in the art. Therefore, it is believed that they need not be described in detail.

The present invention resides in the fact that the axle 62 of the flywheel 58 is extended downwardly below the flywheel, to provide a second capstan 18′. The capstan 18′ is, of course, suitably mounted in bearings 64. The two capstans may comprise an integral shaft, as shown, or may be otherwise connected together. It is pointed out that the capstan 18′ is so positioned as to bear against the wheel 38 in the cartridge 24 when the cartridge is inserted into the device as shown in FIGURE 3. Thus, tape 34 is pressed between the wheel 38 and the capstan 18′, and, as the flywheel 58 and capstan 18′ rotate, the tape 34 is advanced past the heads that contact the tape in the cartridge. This tape movement is, of course, synchronized with the movement of the tape 14 in the reel-to-reel portion of the device. Thus, it is apparent that a single drive mechanism serves to power both the reel-to-reel advancement mechanism and the cartridge mechanism.

Many of the structural details of the apparatus shown in FIGURE 3 have been omitted because they are entirely conventional in nature and form no part of the present invention.

What is claimed is:

1. A tape drive mechanism comprising reel-to-reel tape drive apparatus and adapted to have a tape cartridge inserted in said mechanism, said reel-to-reel apparatus having a first tape therein and said cartridge having a second tape therein, a first capstan for engaging and driving first tape in said reel-to-reel apparatus, and a second capstan connected to said first capstan for engaging and driving said second tape in synchronism with said first tape when said cartridge is inserted in said mechanism, and a flywheel located intermediate of said capstans and driving both said capstans, said tapes being located on opposite sides of said flywheel and said capstans projecting from opposite sides of said flywheel along the axis of said flywheel to engage said tapes.

2. The mechanism defined by claim 1, wherein said first and second capstans comprise an integral shaft, said flywheel being mounted on said shaft intermediate its ends, and means for rotating said flywheel to rotate said capstans.

3. A tape drive mechanism comprising first and second tape drive apparatus, said first apparatus having a first tape therein and said second apparatus having a second tape therein, a first capstan for engaging and driving said first tape; a second capstan for engaging and driving said second tape in synchronism with said first tape, and a flywheel located intermediate of said capstans and driving both said capstans, said tapes being located on opposite sides of said flywheel and said capstans projecting from opposite sides of said flywheel along the axis of said flywheel to engage said tapes.

References Cited

UNITED STATES PATENTS

| | | | |
|---|---|---|---|
| 3,083,269 | 3/1963 | Gaubert. | |
| 3,196,214 | 7/1965 | Knoth. | |
| 3,205,316 | 9/1965 | Hechler. | |
| 3,319,858 | 5/1967 | Schober | 226—181 |

RICHARD E. AEGERTER, *Primary Examiner.*

H. C. HORNSBY, *Assistant Examiner.*